United States Patent [19]
Persson et al.

[11] 4,261,052
[45] Apr. 7, 1981

[54] INTEGRATED SWITCHING AND TRANSMISSION NETWORK

[75] Inventors: Mats A. Persson, Vårby; Arne L. Lövdin, Handen, both of Sweden

[73] Assignee: Telefonaktiebolaget L M Ericsson, Stockholm, Sweden

[21] Appl. No.: 34,902

[22] PCT Filed: May 1, 1979

[86] PCT No.: PCT/SE7800033

§ 371 Date: May 1, 1979

§ 102(e) Date: May 1, 1979

[87] PCT Pub. No.: WO79/00138

PCT Pub. Date: Mar. 22, 1979

[22] Filed: May 1, 1979

[51] Int. Cl.$^3$ ............................................. H04Q 11/04
[52] U.S. Cl. ........................................ 370/59; 370/60; 370/66
[58] Field of Search ................. 179/15 AT, 15 AQ; 370/59, 60, 66, 68

[56] References Cited

U.S. PATENT DOCUMENTS

| | | | |
|---|---|---|---|
| 3,912,871 | 10/1975 | Battocletti | 179/15 AT |
| 3,937,895 | 2/1976 | Karl | 179/15 AT |
| 4,060,698 | 11/1977 | Birnie | 179/15 AT |

Primary Examiner—Douglas W. Olms
Attorney, Agent, or Firm—Hane, Roberts, Spiecens & Cohen

[57] ABSTRACT

An integrated switching and transmission network includes a digital switching system for transferring communication information without congestion. The switching system consists of one-way switch modules (SM) which are connected through two-way time division multiplex transmission links (La-Lb) to link modules (LM) each including a control unit (CU) for establishing communication paths within an associated line group (LG) as well as for controlling the switching system in cooperation with the control units of other line groups. Each of the switch modules (SM x/y) is allotted to two of the two-way links and comprises a time stage (TS) and a signalling logic circuit (SL). The input of each module is connected exclusively to one way (La,x) of one (La,x-Lb,x) of the two-way links, whereas the output of each module is connected exclusively to the other way (Lb,y) of the other two-way link (Lay-Lby). For the reliable control of the network, transmitting control units generate signals. Each signal addresses one of the signalling logic circuits, which converts the signal to an operation signal by which the associated time stage is operated or to a signal intended for the receiving control unit. Furthermore, control messages are used and transferred between the control units through the time stages. The time stages carry out the required time interchanges for the transfer of said control messages and communication information between the line groups.

2 Claims, 6 Drawing Figures

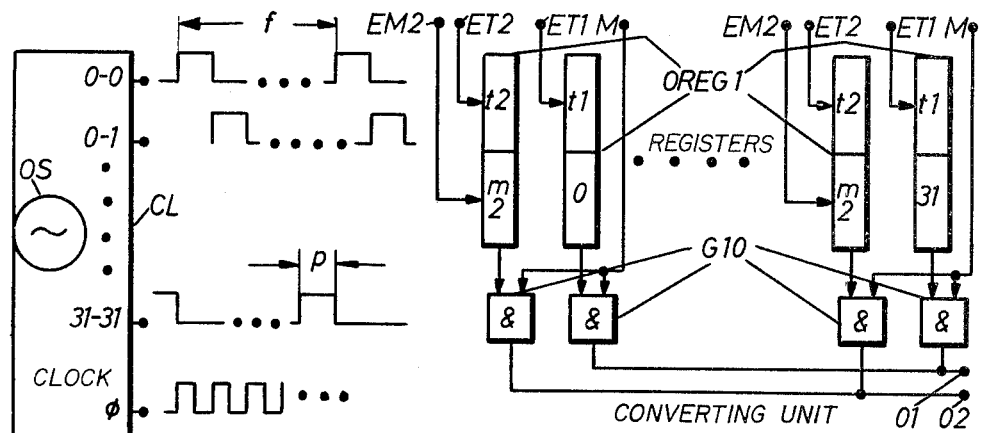
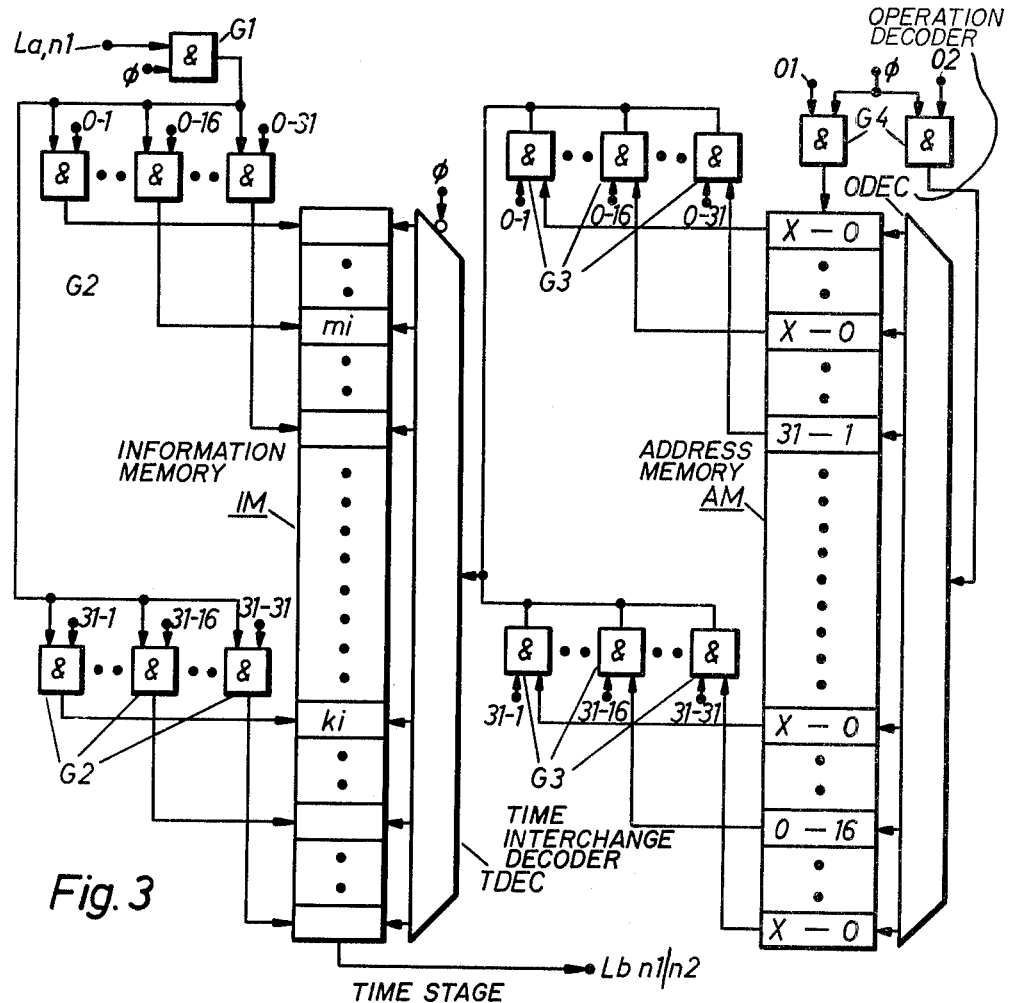
Fig. 2
Fig. 5
Fig. 3

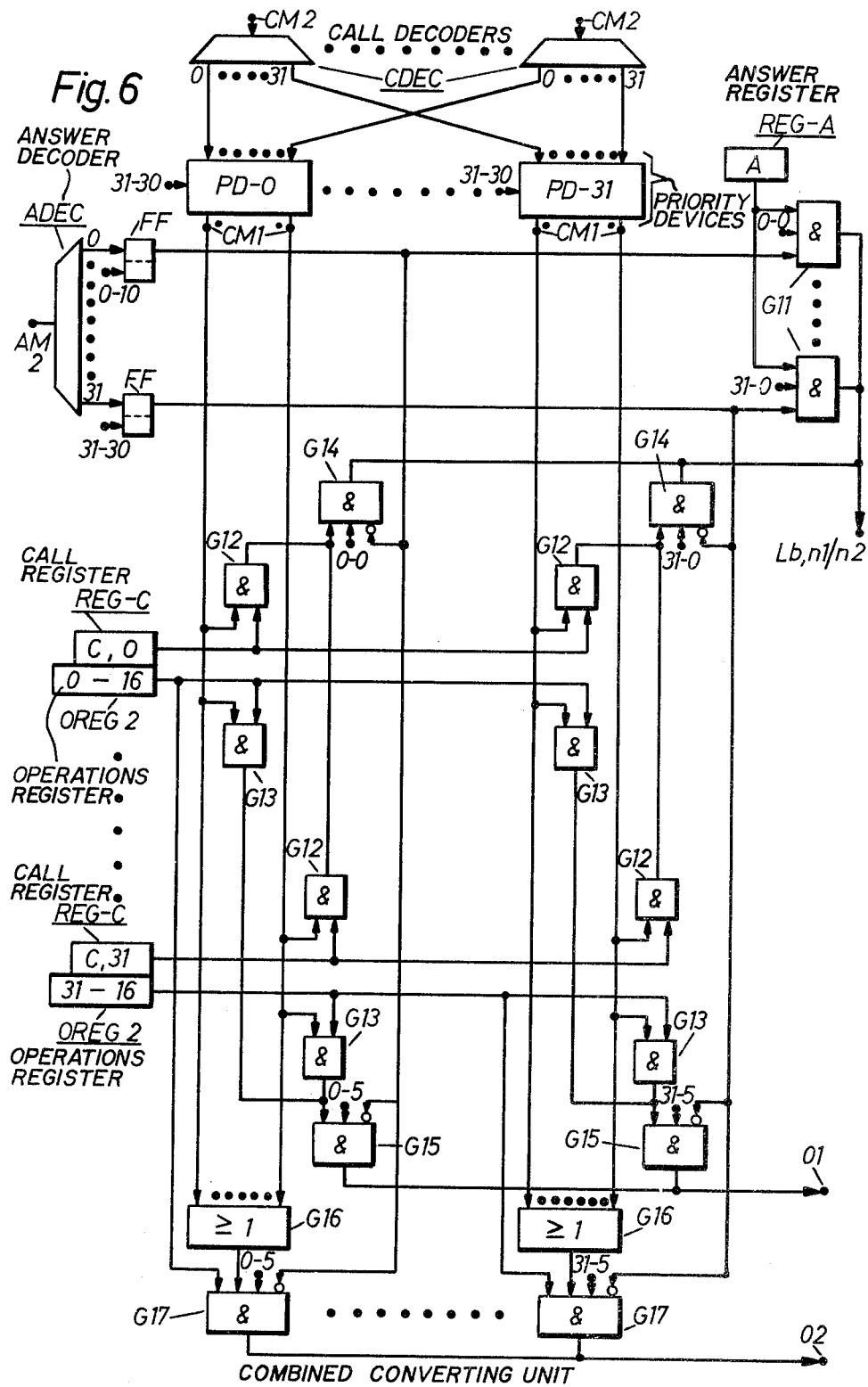

INTEGRATED SWITCHING AND TRANSMISSION NETWORK

BACKGROUND OF THE INVENTION

The present invention relates to an integrated switching and transmission network comprising line groups. Each line group is connected to an associated link module containing a transmitter and a receiver. Each link module is connected to an associated link connection consisting of a first link and at least a second link in order to transfer, in time division multiplex form, digital communication- and signal information from the transmitter to a congestion free digital switching system containing identical switch modules and from the switching system to the receiver. The switching system carries out space interchanges and time interchanges in order to switch digital information which is transferred by means of the mentioned link connections between arbitrary time division multiplex channels.

In a telecommunication system similar switch modules are used to produce switches which are easy to handle and which enable the capacity of the system to be expanded during normal operation. Switch modules only enable the system to be expanded satisfactorily if a module has been initially so constructed that its properties can remain unchanged independently of the switching capacity of the switching system. Switch modules which are included in frequency division multiplex telecommunication systems and which only perform space interchanges have been well known for a long time. Such analogue switch modules form stages interconnected by means of connection link groups which, in order to expand the system, are modified by adding further modules. Switch modules, however, which are included in time division multiplex systems are more difficult to produce because normally both space interchanges and time interchanges occur to transfer information between subscriber's lines connected to the time division multiplex switch- and transmission system. Principally similar modules can only be produced if one module carries out both types of interchanges.

It is known to use time division multiplex switching principles which, for example, are indicated as "time-space-time"- or "time-space-space-time"- or "space-time-space"- principles, the indication showing in which turn information coming in to the switching system in time division multiplex form is transferred between time stages to carry out time interchanges and space stages to carry out space interchanges.

A known module switch for time division multiplex digital information, which is described in "Colloque International de Commutation Electronique, Paris 1966, pages 513–520", mainly contains similar modules each switching between a number of input links and a number of output links, the time division multiplex format, i.e. the number of time slots per frame, being different for different types of links, and the space interchanges within a module being obtained by means of an internal multiplex format having at least as many time slots as there are information channels coming to the module. Time division multiplex links arranged between the modules have the same function as the mentioned connection link groups, one group being constituted by one single link connection having a time division multiplex format which guarantees that connections are established without congestion.

In Swedish Pat. No. 379.473 a "time-time"-switching principle is described which is achieved by means of input modules which through a single common time division multiplex connection are connected to output modules Thanks to said common time division multiplex connection a space stage is avoided and compared to the first mentioned known module switch, improved handling possibilities are obtained. When a module breakdown occurs, the faulty module is replaced by a fault free module without affecting the switching capacity of the other modules. Upon an expansion of the system, further input- and output modules are connected to the mentioned common time division multiplex connection, if required during operation.

Besides the above mentioned points concerning the modules dividing the switching system, the way in which the paths through the switch are established, i.e. the control of the switch, plays an important part in the reliability and the economics of a telecommunication system. It is known for example from the above mentioned publications, to control a digital time division multiplex switch by means of a central computer, which receives from subscribers' lines or from remote concentrators control signals defining an order for establishment of a connection. The computer finds, owing to the mentioned control signals, the addresses, indices, time slots, connection link numbers and so on which, depending on the chosen switching principle, must be transferred to the time- and space stages and the modules of the switch in order to establish the instructed connection. In the oldest time division multiplex systems an extra control communication system was arranged for the connection of the computer. In modern and improved time multiplex systems, for example the digital "time-space-time"-system being described in the Swedish Pat. No. 353.996, a relief of the computer is aimed at, at the same time as the mentioned control communication system as far as possible is included in the proper time division multiplex information transferring system.

An object of the present invention is to achieve an easily handled and an easily expandable IST (Integrated Switching and Transmission)-network whose congestionfree "space-time"-switching system has identically designed switch modules which are controlled in a decentralized manner without an extra control communication system and completely without a centrally arranged control unit or computer.

BRIEF DESCRIPTION OF THE DRAWING

The proposed IST-network the characteristics of which appear from the characterizing parts of the claims, will be explained by means of the accompanying drawing wherein:

FIG. 2 shows a synchronizing clock;
FIG. 3 shows a time stage of a switch module;
FIGS. 5 and 6 each show a signal converting unit.

DESCRIPTION OF THE PREFERRED EMBODIMENT

Figure 1:
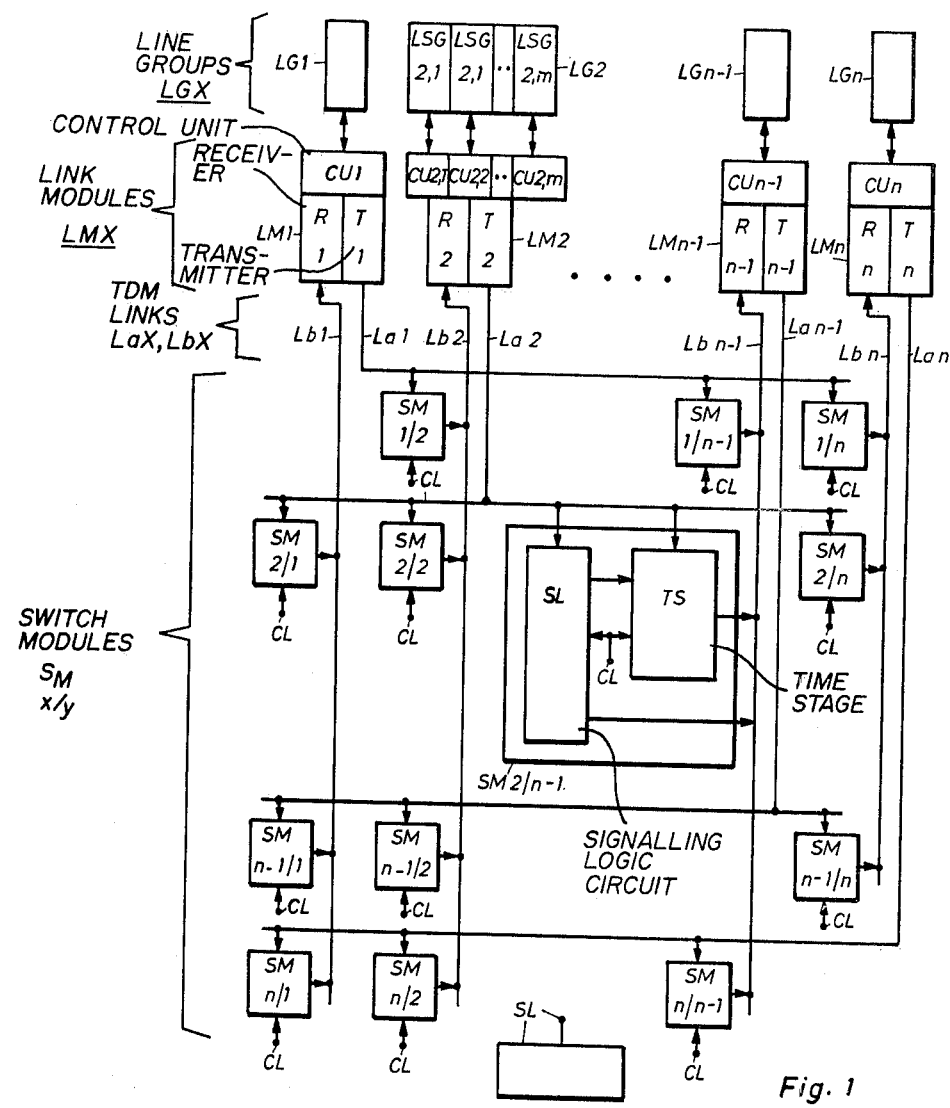
FIG. 1 is a block diagram of an IST-network.

FIG. 1 shows n line groups LG1-LGn between which telecommunication connections are achieved by means of n link modules LM1-LMn and a digital switching system comprising at least $n^2-n$ switch modules SM. Each link group, for example LG1, is associated with a link module LM1 comprising a transmitter T1 and a receiver R1 which through a time division multiplex link La,1 and Lb,1 respectively is connected to switch modules SM1/1–SM1/n which are shown in rows in FIG. 1 and switch modules SM1/1–SMn/1 which are shown in columns. The time division multiplex links transfer in time division multiplex form digital communication- and signal information from the link modules to the digital switching system and vice versa.

The IST network which is shown in FIG. 1 is simplified in order to clarify the description and only those network parts which are needed to explain the present invention are shown. The time division multiplex synchronization of the IST network, for instance, is indicated by means of only one clock CL which is connected to all switch modules so that the receivers R1-Rn receive the information coming from the switching system during synchronous frames. Within each link module a frame synchronization is performed so that also the information being transferred from the transmitters T1-Tn to the switch is synchronous. In practice the synchronization conditions are not so ideal but phase displacements and so called plesiochronous information transmissions to the switch occur owing to the fact that in larger networks the link modules are each allocated one clock. It is, however, known to synchronize the information coming to the switch for example by taking the clock which is the fastest for the moment, and known to arrange phase compensation circuits in the link modules and to make use of so called "pulse stuffing" arrangements to avoid information losses. Below it is consequently assumed that the link modules, link connections and switch modules form an ideally synchronized system.

A time division multiplex format is, as known, mainly defined by its frame frequency, which is for example 8 kHz, and by the number of time slots per frame period; for example, there may be m groups each comprising 32 time slots. In each time slot an information unit is transferred, which in a digital system consists of a digital word consisting of a number of bits, for example 8. Most time slots in a frame period are allotted to the proper communication information but a few time slots, for example 2 within a 32-time slot group, are reserved for the purpose of synchronization and signalling. It is assumed in the proposed IST-network that the synchronization does not demand a time slot in each frame period but that so called idle signals indicating that there is no need for signalling within a given time slot group, furthermore are used as synchronization signals so that, practically, the above mentioned few time slots can be used for digital signals and signal messages, as will be described more in detail, relating to the communication channels of a 32-time slot group which channels may partly be intended for pulse code modulated speech transmissions and partly for data communication.

It is known in an IST-network to use both parallel and serial transmission and to vary between time division multiplex formats having different multiples of 32-time slots. It is assumed for the network shown in FIG. 1 that the same format and transmission principle is used for the links La, Lb. (Known parallel serial or serial parallel converters, if any, are included in the link- and switch modules of the network and are not shown in FIG. 1.) Additionally analog/digital- and digital-/analog converters can be arranged either in the subscribers' lines or in the link modules, but these are not shown either as they do not form part of the present invention. Neither are known concentrators shown which may be included in the link modules and which are necessary if a line group comprises a greater number of subscribers' lines than there are time slots in the time division multiplex format being chosen for the link connections.

In FIG. 1, each link module comprises at least one control unit CU which is allotted to a line subgroup. Each control unit controls the allotting of a number of time slots on the respective link pair Lax/Lbx; for example one of the mentioned m 32-time slot groups, to transfer the communication information of the subgroup and associated signal information to and from the switch. In FIG. 1 a system is shown which is so extended that only one control unit is arranged in each link module except in the link module LM2 which comprises m control units CU2,1–CU2,m, and so that the line group LG2 consequently comprises m subgroups LSG2,1–LSG2,m. The mentioned m control units have the use of a 32-time slot group each, i.e. altogether they have the use of all of the time slots of the link pair La2/Lb2. The link module LM2 comprises a concentrator not shown in FIG. 1 if one of the mentioned line subgroups comprises $>30$ subscribers' lines, because by means of the associated control unit 30 lines at most can be connected at the same time in time division multiplex form for example to the link connection La2.

A control unit included in a link module is designed in such a way that it controls the establishment of connections within its own line subgroup. If the link module only has one control unit the switch does not necessarily need to have a switch module switching between the time slots on the link pair connected to this link module but the link module can contain, in this case, an internal switch to achieve internal subgroup connections. Furthermore if the subscribers' lines of this subgroup each have a separate connection to the link module, the internal switch constitutes a space stage. The advantage of having an internal switch is that the subgroup internal communication connections on the associated link pair do not make use of time slots intended for communication information nor time slots intended for signal information. Thus an increased switching capacity is obtained. As, on the other hand, the communication information of the subgroup is nonetheless converted into time division multiplex digital information which is switched through the switching system to other link modules, and as the internal switch required in the link module mostly cannot be designed simpler than a switch module, the greatest possible uniformity of the IST-network is obtained if the switching system comprises $n^2$ equal switch modules. Switch modules, for example SM2/2, connected through a link pair La2/Lb2 to the associated link module LM2 each must, however, always be provided if the link modules comprise $>1$ control units because connections between subgroups belonging to the same line group, for example between LSG2,1 and LSG2,m, can be connected only through the switching system. In the switching system shown in FIG. 1 the modules SM1/1, SMn-1/n-1 and SMn/n have been omitted (it is assumed that the link modules LM1, LMn-1 and LMn contain internal switches which are not shown).

A control unit included in a link module is furthermore designed in such a way that it, together with control units of other subgroups, controls the switching system when establishing external connections between its own subgroup and said other subgroups, whereby the above mentioned time slots intended for signal information are used. This means, in other words, that the control intelligence of the whole IST-network is distributed over the decentralized control units. Each of the modules of the switching system comprises a time stage TS and a signalling logic circuit SL, which are completely passive and without intelligence of their own. Each module, besides the clock CL in order to achieve synchronism, is connected exclusively on the input side to one of the transmitters T1-Tn and on the output side to one of the receivers R-Rn. Thus the switch is not provided with any intelligent central control unit. The decentralized control units of the link modules obtain their intelligence for example by means of programs stored in memories. The stored program controlled control units do not need to be described in detail in relation to the present invention. When establishing the external connections the functions of the control units of the instant IST-network, that is the signaling either between control units or between a control unit and the switching system, are performed by means of computers known per se such as Motorola's micro computer M6800, programmed in a suitable manner. What follows explains the most important functions:

The signalling between two control units aims at interchanging messages which are coded for example according to a signal system having the CCITT-designation X-25. The structure of the signal system does not need to be described in detail in order to understand the present invention but it is sufficient to mention that each message unit is coded in such a way that the receiving control unit knows when all of the message unit, consisting of an individual number of digital words, has been received. Furthermore the structure of the signal system is such that an interchange of message units in both traffic directions results in both controls units knowing whether a communication connection is not to be established through the switching system, is to be established or is to be released by means of addresses and time slots, which have been obtained due to completed signalling process between two control units. In the instant IST-network the messages of the signal system are transmitted during one of the time slots intended for signal information, below called time slot 16. In order to transmit a message unit for example from the control unit CU2,m to the control unit CU1, the switch module SM2/1 must perform a time interchange from time slot 16 within the 32-time slot group allotted to the control unit CU2,m to the time slot 16 within the 32-time slot group allotted to the control unit CU1, a so called 16—16 interchange. The operation of the switch module will be described below. Before the control unit CU2,m starts transmitting the mentioned message unit, it has to know that neither the switch module SM2/1 being ordered by for example the control unit CU2,1 nor one of the switch modules SM>2/1 being ordered by one of the control units CU>2 are carrying out any 16—16 time interchange to transfer another message to the control unit CU1.

In order to achieve a reliable message communication, the control unit CU2,m transmits first during the second of its time slots intended for signal information, below called time slot 0, a call signal addressed to the control unit CU1. The address to the control unit CU1 also defines the only switch module SM2/1 through which the call signal has to be transferred. A control unit transmits the call signals one at a time, indicating that the transfer of the intended message unit has to be finished before this control unit transmits a new call signal.

Owing to call signals which a control unit has received during its allotted time slot 0, this control unit transmits answer signals one at a time during its time slot 0, indicating that the transfer of the intended message unit by means of the respective call signal has to be completed before this control unit transmits a new answer signal concerning another call signal. In the assumed signalling example the control unit CU1 transmits, according to the mentioned "one at a time"-rule, an answer signal addressed to the control unit CU2,m. The address to the control unit CU2,m also defines the only switch module SM1/2, through which the answer signal has to be transferred.

The mentioned "one at a time"-rule concerning calls and answers renders the following acknowledgement operations possible: A call signal is continously repeated until the associated answer signal has been received. When the received call signal ceases the called control unit knows that its answer signal has arrived at the calling control unit. Also an answer signal is repeated at least until the first word of the message unit has been received. When the answer signal ceases the calling control unit knows that the mentioned 16—16 connection works reliably. There are, however, maximum times to how long the call- and the answer signals are transmitted. If no answer signal or no message work has been received after the maximum time the waiting control unit generates an alarm signal.

When the called control unit, the control unit CU1 according to the example, has received the whole message unit during its time slot 16, it transmits to the calling control unit, the control unit CU2,m according to the example, during its time slot 0 a signal the contents of which indicate that the message unit either is correctly received or has to be retransmitted. The mentioned "correctly received"- and "retransmission"-signals are modified answer signals having the property in common that they do not have to contain the address of the called control unit, because, due to the "one at a time"-rule the calling control unit knows that such answer signals have to come from the called control unit. The mentioned acknowledgement principle is also used to complete the transfer of the message unit in a reliable manner. The called control unit continuously repeats the mentioned "correctly received"-signal. The calling control unit answers by continuously transmitting a "correctly received"-signal to the called control unit. When the called control unit receives the "correctly received"-signal it completes its "correctly received"-transmission. When the calling control unit no longer receives "correctly received"-signals also the calling control unit completes its transmission.

The mentioned signalling process results a single message unit being reliably transferred in one traffic direction. In order to achieve a message interchange an equivalent process is repeated for the other traffic direction, whereby the two control units change their roles.

Besides the mentioned "one at a time"-rule there is a first priority rule according to which a control unit has to answer received call signals before it as the calling control unit starts or continues a message interchange. The mentioned first priority rule prevents too large an accumulation of unanswered call signals. The mentioned maximum time valid for call signals is determined with reference to the fact that a control unit can be called by all the other control units of the IST-network during the same frame period. Queuing problems occur not only in the called control unit but also in the associated switch modules and the associated link connection in order to transfer the call signals from the switch to the called control unit. Furthermore the mentioned types of answer signals share in the queuing of signals addressed to a control unit, but due to the "one at a time"-rule there is maximum one signal of answer type together with a number of call signals. The solution of the mentioned queuing problem will be described below.

During frame periods, which are neither occupied to transfer the hitherto explained signals of call- or answer type nor establish signals or release signals being explained as follows, the time slots 0 on the link connections of the IST-network are used to transfer the above mentioned idle signals.

The signalling between the control units and the switching system aims at establishing or releasing the mentioned 16—16-connections between the control units, as well as m1,t1-m2, t2 connections which are included in communication connections between the subscribers' lines. Thus the switch performs time interchanges from the time slot 16, being allotted a transmitting control unit, to the time slot 16, being allotted a receiving control unit, as well as from the time slot t1 associated with the 32-time slot group m1 in question, during which the communication information in question is received by the switch, to the time slot t2 associated with the 32-time slot group m2 in question, during which the switch transmits the mentioned communication information. As will appear from the explanation of the passive functions of the switch the above mentioned call signals are used to establish the mentioned 16—16-connections. In order to establish an m1,t1-m1,t2-connection, a control unit, for example CU2,1, the n1-number of which is 2, transmits an establish signal during its allotted time slot 0 which at the same time defines the 32-time slot group m1=1 of the control unit. The establish signal contains an establish code as well as an n2-number, for example n2=2, to address the only switch module in question, the switch module SM2/2 according to the example. The establish signal contains furthermore the mentioned time slots t1 and t2 as well as an m2-number, for example m2=2, to indicate the receiving subgroup of the subscribers' lines and its 32-time slot group including the mentioned time slot t2. According to the example the establish signal indicates a one-way communication connection from a subscriber's line of the subgroup LGS2,1 (n1=2, m1=1) to a subscriber's line of the subgroup LGS2,2 (n2=2, m2=2). The signalling logic of the receiving switch module SM2/2 converts the establish signal into operation signals by means of which the time stage of this switch module establishes the intended connection. The establish signal, owing to its n2-number, does not influence any other time stage in another switch module. In this elegant manner the space interchangess of the switch are carried out without conventional space stages and without special space interchange signals.

In order to release an m1,t1-m2,t2-connection a control unit transmits during its allotted time slot 0 a release signal defined by means of a release code, the mentioned release signal differing from an establish signal only by the fact that an information of a t1-time slot is unneccessary. A release of a 16—16-connection is signalled to the switch either by means of the above mentioned "correctly received"-acknowledgement signal or by means of a release signal containing t2=16.

The mentioned signals generated by the control units each comprise, as the message units of the signal system, a code and variable in question such as the mentioned n1,n2- and m1,m2-number addresses and t1,t2-time slots. In a larger system having for example 8 link modules each comprising 32 control units, in order to switch in a congestionless manner and without need for concentrators between about 8000 subscribers' lines, the signals cannot be each defined by means of only one digital word comprising 8 bits. In IST-time division multiplex systems, so-called multiframes are introduced to transfer such signals comprising several words, whereby multiframes having a constant or a varying number of frame periods exist. In connection with the explanation of the working manner of the switch the mentioned known multiframe technique will to the necessary extent be referred to.

Below, principles are described concerning the passive operation of a signalling logic circuit SL in one of the switch modules SM of the proposed IST-network. The signalling logic circuit has: receiving units only reacting to the associated n2-number address and respective signal code; and converting units which convert signals arriving at the switch module to the mentioned operation signals and to signals going out from the switch module. The converting units for treating the call signals decide, according to a simple second priority rule, which of the call signals, arriving at the same time and addressed to the same receiving control unit is converted into an operation signal to establish respective 16—16-connection to this control unit, and into a call signal going out to this control unit. The converting units for treating signals of the above-mentioned answer types have a simpler design than the call converting units. Due to the above-mentioned "one at a time"-rule it is sufficient if the receiving control unit receives the very answer code while a converted call signal has to give information from which control unit of which link module the call comes. The treatment of the answer signals does not demand any priority rule.

It is obtained that a receiving control unit, for example CU2,2, receiving signals from switch modules SM1/2-SMn/2 shown in column in FIG. 1, at the same time can be called through all switch modules of respective column (n2=2) and can receive an answer through one of the switch modules of the column. If the receiving control unit is connected to the mentioned column of switch modules by means of a common time division multiplex link, according to the example and FIG. 1 link Lb,2, a multiframe has to be decided concerning the time slot 0 of the receiving control unit. Within this multi frame, for example the switch modules of the column and consequently the calling link modules are associated with an n1-frame period each to transfer call signals, and with a frame period common to all of the switch modules in the column to transfer signals of answer type. The mentioned common frame period is not needed if the mentioned call- and answer converting units are modified so that an answer signal inhibits a call signal. Each switch module then transmits during a time slot 0 only one signal, either an answer type signal or a call signal. If, furthermore, a separate time division multiplex link is arranged for each of the switch modules, in order to transfer information to respective link module, one avoids the mentioned multiframe forming concerning signals going from the switching system. In an IST-network modified by means of the mentioned separate links, which will be explained in connection with FIG. 6, one obtains a quicker signalling process having shorter maximum times than the system shown in FIG. 1 having the mentioned common links Lb.

FIG. 2 shows the common clock CL of the switching system, mentioned at the beginning, in order to generate a time division multiplex format comprising 32 time slot groups each having 32 time slots. A frame period lasting $f=125$ μs comprises $32\times32$ time slots so that the duration of each time slot, p, is approximately 122 ns. The time slots are designated by means of two numbers $0\leq m\leq 31-0\leq t\leq 31$. The time slot 0—0 starts a frame period, precedes the frame period 0-1 and follows the last time slot 31—31 of the previous frame. The clock defines the time slots by means of pulse series shown in FIG. 2, which are generated in a known manner, for example by means of a shift register. It is assumed that the IST-network uses the parallel transfer principle, therefore there is no dividing in bits within the time slots. The clock is provided with an output $\phi$ which according to FIG. 2 transmits a pulse series which within each time slot comprises a pulse and an interval. The $\phi$-pulses are needed in order to avoid, in a known manner, coincidence in the writing- and reading operations described below in connection with the time interchanges. The clock is driven by an oscillator OS, the basic frequency of which is $2^{3+5+5+1}$ kHz ≈ 16 MHz.

FIG. 3 shows a time stage known per se to perform time interchanges within the mentioned $32\times32$ time division multiplex format. The time stage mainly comprises an information memory IM and an address memory AM. The writing inputs of the information memory are through an AND-gate G1 and through $32\times31$ AND-gates G2 connected to the link La,n1 for incoming information. During the $\phi$-pulses of a frame, communication- and message information arriving during the time slots m-1 to m-31 is written in associated locations of the information memory, while singals arriving during the time slots m-0 are not registered in the information memory. Thus, the communication information and the message information transferred on the link La,n1 is registered in all of the switch modules connected to the link, the mentioned switch modules forming a row in FIG. 1. The address memory AM has its reading outputs connected to a time interchange decoder TDEC through $32\times31$ AND-gates G3, the mentioned decoder addressing the information memory during the $\phi$-intervals for reading to the link Lb,n1/n2 going out from the switch module. The n1- and the n2-designation defines respectively, according to FIG. 1, the transmitter Tn1 and the receiver Rn2 associated with the time stage.

In FIG. 3 it is assumed that the time interchange decoder receives the addresses 31-1 and 0-16 respectively during the time slots 0-31 and 31-16, while during the other time slots the addresses m-0 are transferred, which do not occur in the information memory. The communication information ki registered in the information memory during the time slot 31-1 is transferred during the time slot 0-31 to the link Lb,n1/n2, and the message information mi registered during the time slot 0-16 is switched to the time slot 31-16, but the remaining information registered in the information memory is not transferred to the outgoing link. The address memory AM has its writing inputs connected, through an operation decoder ODEC and through AND-gates G4 activated during the $\phi$-pulses, to the operation inputs 01 and 02 of the time stage.

Figure 4:
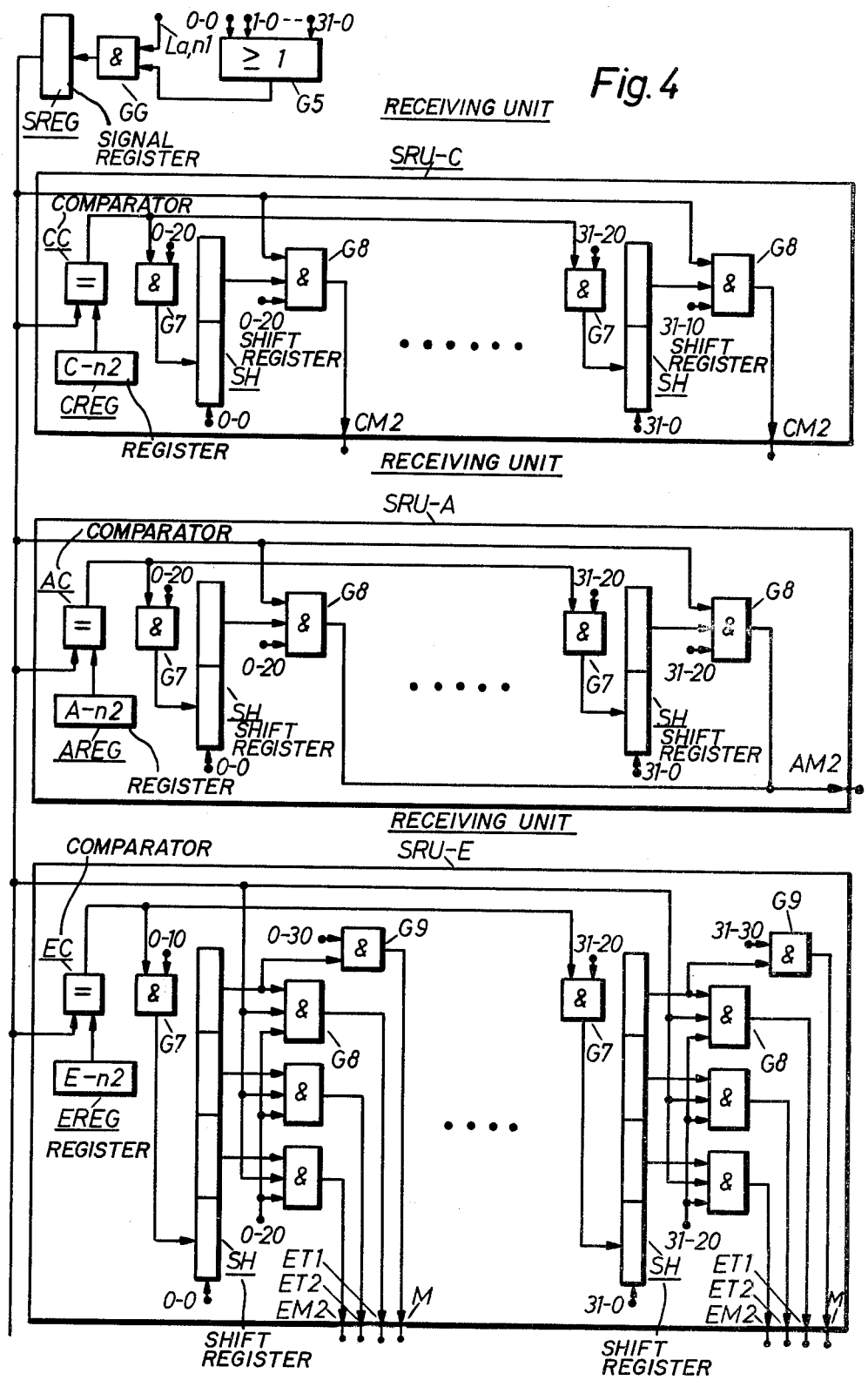
FIG. 4 shows three signal receiving units.

FIG. 4 shows signals receiving units SRU-C, SRU-A and SRU-E, which are included in the signalling logic of a switch module SMn1/n2 and which receive call-, answer- and establish signals registered in a signal register SREG. For the above-mentioned release signals and signals of answer type the signalling logic comprises further receiving units corresponding to the mentioned receiving units SRU-E and SRU-A and therefore not shown in FIG. 4.

The mentioned signal register SREG registers by means of an OR-gate G5 and an AND-gate G6 during the time slots m-0 idle-, call-, answer-, and establish- or release signals coming from the link La,n1. Each call- or answer signal consists of two digital words, the first of which contains, besides respective code C or A, an n2-number in order to address the switch module SMn1/n2, and of which words the second contains an m2-number to address one of the receiving control units connected to this switch module. An establish signal consists of four digital words, the first of which contains, besides the extablish code E, an n2-number to address the switch module SMn1/n2, and of which words the second, third and the fourth contain the above explained m2-, t2- and t1- establish information respectively.

The signal receiving units each comprises a code register CREG, AREG and EREG to constantly store the mentioned C-n2-, A-n2- and E-n2- information respectively. Furthermore the signal receiving units each contain a comparator CC, AC and EC, the one input of which is connected to the respective mentioned code register CREG, AREG and EREG and the second input of which is connected to the mentioned signal register SREG. Each of the mentioned comparators has its output connected to 32 AND-gates G7, which are each activated during a test pulse, according to FIG. 4 the time slot 0-20, 1-20 . . . 31-20, and whose outputs are each connected to a first shift stage of shift registers SH which are clocked by means of the clock pulses 0-0, 1-0 . . . 31-0. In correspondence to the number of words of the signals the mentioned shift registers contain two or four shift stages. Thus, for example, the other shift stages are activated between the second and the third 0-pulse after that test pulse during which the connected gate G7 is activated. The second, third and fourth shift stages of the mentioned shift registers SH are each connected to a first input of an AND-gate G8 whose second input is connected to the signal register SREG and whose third input is activated coincidently with that gate G7 which is connected to the respective shift register. The outputs of the mentioned gates G8 constitute the outputs CM2, AM2, EM2, ET2 and ET1 of the signal receiving units, from which the above mentioned m2-, t2- and t1-numbers are transmitted. The receiving unit SRU-A for answer signals is provided with a common output AM2 while the receiving units SRU-C and SRU-E for call- and establish signals are provided with separate outputs CM2 and EM2, ET2, ET1, which each are allotted to a transmitting control unit defined by means of an m1-number. The receiving unit SRU-E for establish signals is furthermore provided with outputs M which are activated by means of AND-gates G9 during a first operation pulse occurring after a respective test pulse and, according to FIG. 4, constituted by that m-30-pulse which coincides with the activation of the fourth shift stage of the respective shift register.

FIG. 5 shows a converting unit for establish signals comprising first operation registers OREG1 and AND-gates G10. The mentioned first operation registers are connected to the mentioned outputs EM2, ET2 and ET1 of the receiving unit SRU-E but also comprise register parts to constantly store the M1-number of the respective transmitting control unit. The mentioned gates G10 associated with the respective m1-number have their inputs connected to the mentioned output M of the receiving unit SRU-E and to the mentioned first operation registers OREG1 and have their outputs connected to the mentioned operation inputs 01 and 02 of the time stage in such a manner that the m1-t1-operation information is written during the $\phi$-pulse of the mentioned first operation pulse in memory locations of the address memory AM of the time stage, the location addresses being defined by means of the m2-t2-operation information.

FIG. 6 shows a combined converting unit for call- and answer signals. The m2-numbers obtained from the receiving unit SRU-A for answer signals through the mentioned output AM2 are decoded by means of an answer decoder ADEC and "1"-set bistable flip-flops FF. An "1"-set flip-flop indicates that the associated m2-control unit shall receive an answer signal and activates the first input of an AND-gate G11 associated with the same m2-number, the second input of which is activated during the time slot 0 of the same m2-number and the third input of which is connected to an answer register REG-A which constantly stores an answer code A. The "0"-setting of the flip-flops is achieved by means of reset pulses associated with respective m2-number, 10-pulses according to FIG. 6. The outputs of the mentioned gates G11 are connected to the link Lb,n1/n2 going out from the switch module.

The m2-numbers obtained from the receiving unit SRU-C for call signals through the mentioned outputs CM2 are decoded by means of call decoders CDEC, which are associated each with an m1-number for transmitting control units. The mentioned call decoders have their outputs connected to priority devices PC-0 to PD-31 each associated with an m2-number for receiving control units. Each priority device selects, according to the above mentioned second priority rule, one of the control units which, during a frame, calls the associated receiving control unit. Each priority device is provided with outputs CM1 associated with an m1-number each and of which outputs a maximum of one is consequently activated between two successive priority pulses occurring after the test pulse of the time slot group m=31 and which priority pulses, according to FIG. 6, constitute 31-30 pulses. The mentioned outputs CM1 are each connected to an AND-gate G12 and an AND-gate G13. The mentioned gates G12 transfer in an activated state outgoing call signals through AND-gates G14 to the link Lb, n1/n2 going out from switch module SMn1/n2. The mentioned outgoing call signals containing, besides a call code C, the m-1 number of the calling control unit are constantly stored in call registers REG-C. The mentioned gates G13 transfer in an activated state m1-16-operation information through AND-gates G15 to the operation input 01 of the time stage. Each priority device PD associated with an m2-number, furthermore, has all of its outputs connected to an OR-gate G16 the output of which is connected to the first input of an AND-gate G17 which in an activated state transfers m2-16-operation information to the operation input 02 of the time stage. The mentioned operation information m1-16 and m2-16 being constantly stored in second operation registers OREG2 is used to establish 16-16-message connections. Both inputs of a gate G12 or of a gate G13 are associated with the same m-number. Furthermore the mentioned gates G17 each have a second input connected to that register of the mentioned second operation registers OREG2 which stores an m-number corresponding to the m-number of respective priority device.

The mentioned gates G14 are opened during the time slot 0 of the respective receiving control unit provided that a call but no answer is to be transferred to the receiving control unit. If an outgoing call signal is transferred to the receiving control unit, the gates G15 and G17 associated with the respective m2-number are opened during a second operation pulse associated with the respective time slot group, the m2-5 pulse according to FIG. 6.

The mentioned gates G11 and G24 are controlled without the above mentioned multiframe forming as it is assumed that the mentioned link Lb,n1/n2 separately connects the switch module SMn1/n2 to the link module defined by means of the n2-number. Thanks to the separate link Lb,n1/n2 the outgoing call signals do not need to contain the n1-number being associated with the transmitting link module.

We claim:

1. In an integrated switching and transmission network comprising a plurality of line groups connected to a congestion free digital switching system comprising identical switch modules, through respective link modules each containing a transmitter and a receiver and through respective link connections each containing a first link and at least a second link for transferring in time division multiplex form digital communication informaion and signal information from the transmitter to the switching system and from the switching system to the receiver respectively, said switching system carrying out space interchanges and time interchanges to switch between arbitrary time division multiplex channels for digital information which is transferred by means of said link connections, wherein the improvement comprises that each of a first group of said modules is associated with a respective pair of said link modules and has, through said link connections, its input connected to the transmitter of one of said associated pair of link modules and its output connected to the receiver of the other of said associated pair of link modules, that each module of said first group of switch modules comprises a time stage means for carrying out time interchanges of the communication information being switched between the associated transmitter and the associated receiver, that each module of said first group of switch modules further comprises a signalling logic means for converting signals received from the associated transmitter to operation signals which control the associated time stage, as well as to signals intended for the associated receiver, that the switching system lacks a connection between the input of one and the output of another of said switch modules, that said signalling logic means of the switch modules lack connections to any central control unit included in the switching system, and that each link module comprises a control means for establishing communication paths within the line group associated with that link module and, in cooperation with the control units of other line groups, for controlling the switching system upon establishing connections between that line group and said other line groups.

2. The integrated switching and transmission network according to claim 1 wherein the improvement comprises in that each of a second group of said switch modules is associated with one of said link modules and has its input and its output connected respectively to the transmitter and the receiver through that link connection which is associated with this link module, that each module of said second group of switch modules comprises a time stage means and a signalling logic means which are identical with said time stage means and signalling logic means arranged in each module of said first group of switch modules, and that the line group connected to this link module comprises at least one line subgroup which is connected to a control means included in this link module to establish communication paths within the associated subgroup and, in cooperation with the control means of other subgroups, to control the switching system upon establishing connection between the associated subgroup and said other subgroups.

* * * * *